United States Patent [19]

Walter

[11] 4,146,418
[45] Mar. 27, 1979

[54] PROCESS FOR LABELLING DEEP-DRAWN CUPS

[75] Inventor: Kurt Walter, Glauburg, Fed. Rep. of Germany

[73] Assignee: Hassia Verpackung GmbH, Fed. Rep. of Germany

[21] Appl. No.: 831,225

[22] Filed: Sep. 7, 1977

[30] Foreign Application Priority Data

Sep. 8, 1976 [DE] Fed. Rep. of Germany ....... 2640401

[51] Int. Cl.² ............................................... B29C 3/04
[52] U.S. Cl. ................................... 156/245; 156/252; 156/254; 156/285
[58] Field of Search ............... 156/245, 252, 253, 254, 156/285, 519, 542; 53/26, 29, 170, 172; 264/88, 93, 129, 132, 134, 135; 229/1.5 B

[56] References Cited
U.S. PATENT DOCUMENTS

| 2,797,180 | 6/1957 | Baldanza | 156/245 |
| 2,874,419 | 2/1959 | May et al. | 264/132 |
| 3,503,826 | 3/1970 | Nasica | 156/245 |
| 3,620,871 | 11/1971 | Benson-Petersen | 156/245 |

Primary Examiner—Caleb Weston
Attorney, Agent, or Firm—Posnack, Roberts, Cohen & Spiecens

[57] ABSTRACT

A label is applied to a cup by superimposing a foil tape on a label tape that has a plurality of transverse breaking lines. The tapes are heated to "floatingly" connect the label tape to the foil tape and are then introduced into a deep-drawing apparatus so that the punch thereof may cyclically sever a single label and at the same time form a cup. If the breaking line is fed to the longitudinal axis of the deep-drawing apparatus, the label will be applied to two sides of the cup. If the label tape is fed so that the breaking line is approximately at the far edge of the deep-drawing apparatus then the label will be applied to only one side of the cup. The label tape may be longitudinally slit so that a plurality of cups may be simultaneously deep-drawn.

4 Claims, 5 Drawing Figures

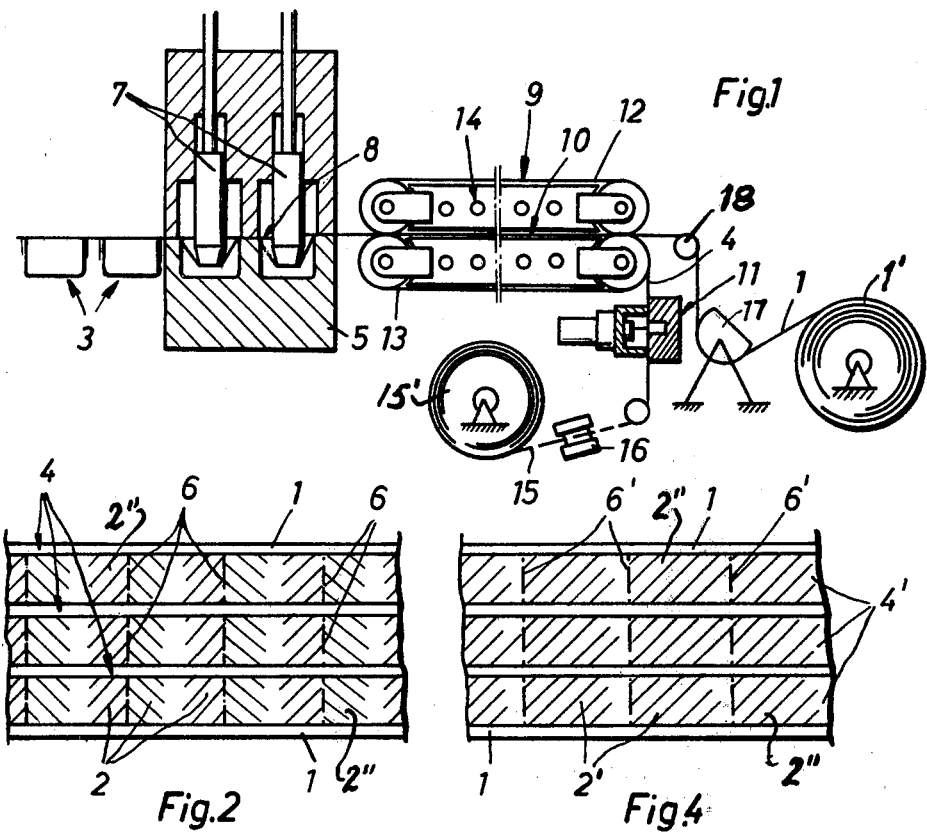

PROCESS FOR LABELLING DEEP-DRAWN CUPS

BACKGROUND OF THE INVENTION

1. Field of the Invention

This invention relates generally to the art of deep-drawing a cup, pan or the like and more particularly to a novel process for applying a foil tape label to one or two opposite side walls of a deep-drawn cup having a square configuration.

2. Description of the Prior Art

A process in the same general field to which the present invention is directed is taught by German Offenlegungsschrift No. 2 434 087, wherein it is disclosed that previously cut labels are sealed from below to the deep-drawing foil passing into the deep-drawing mold and are introduced along with the foil into the deep-drawing mold.

For labelling deep-drawing cups it is, furthermore, known from German Gebrauchsmuster No. 7 327 513 to place the previously punched labels contained in rigid tubes or columns into the molds by means of a suction and transfer mechanism keeping them in position there by suction until termination of the molding operation of the cups and until the label is secured with the shaped cup wall.

The aforementioned prior art processes require relatively costly devices, as opposed to a process according to Austrian Pat. No. 233 817 for the application of labels, plates and the like of weldable or adhesive materials onto hollow bodies in the blowing process in which the label is placed into the hollow mold. During blow molding of a foil hose toward the hollow body, the label is connected to the hollow body. A web is continuously provided with label prints and is introduced between one of the two opened mold halves of the blow molding apparatus and the foil hose, whereupon by closing the blow molding apparatus a label is punched and subsequently during blow molding is connected to the hollow body. This process might be suitable for hollow bodies, i.e. for structures circumferentially closed, where the placement of the design or legend is not too important. However, the Austrian prior art process and the associated apparatus are less suitable for providing a uniform labelling on cups, since on the one hand, a precise positioning of the label punched during the closing of the blow molding is by no means assured during the subsequent blowing operation and, on the other hand, neither the formation of folds (in case of paper or the like) nor imprint displacements (with deformable label foils) are easily avoidable.

SUMMARY OF THE INVENTION

Accordingly, basic to the present invention is the problem of providing a process for labelling deep-drawn cups of square configuration, which process can be carried into effect by means of a very simple apparatus and which assures an accurately positioned application of the labels to the cups, with the labels, depending on the depth of the cups, being adapted to be applied on one side only (with deep cups) or on two sides (with shallower cups).

This problem is solved according to the present invention by a process wherein, depending on the number of cups to be formed in side-by-side relationship from the deep-drawing foil, the label blanks are introduced into the deep-drawing mold as at least one continuous label tape of a corresponding width. Between the repetitive printing formats on the label tape at a spacing conforming to the working cycle of the blow molding apparatus there are included preset breaking lines oriented transversely to the direction of feed of the label tape. By lowering the deep-drawing punch against the deep-drawing foil the preset breaking lines are broken and the labels, prior to their being sealed to the deep-drawn containers, are separated into individual labels.

In this process according to the present invention foil and label tapes thus pass jointly into the deep-drawing mold. The label tape through preheating by means of bonding or adhesive agents are "floatingly" connected to the deep-drawing foil. During closing of the deep-drawing mold the edges of the two tapes are fixedly held while during subsequent lowering of the deep-drawing punch the preset breaking line of the label tape is severed and the resulting label flag or flags abut(s) the mold wall, with the label during this operation remaining in constant but "floating" contact with the deep-drawing foil.

When placing both components onto the mold wall an immediate cooling occurs and the label is fixedly secured to the cup wall. The location of the preset breaking line between two adjacent printing formats conforms to the working cycle with the label tape being adapted to be so cycled that either only one lable is applied to each cup or, respectively, one label is provided to opposite sides of a cup in the feeding direction.

The apparatus for carrying into effect the process of this invention is extremely simple and is composed of a deep-drawing apparatus coupled to which is a combined preheating and foil and label tape feeding mechanism, with a means for the cyclical formation of the preset breaking points being provided in the feeding path of the label tape. Thus, the apparatus used in the process of the present invention will not require any costly punch means, columns for stacking the labels or correspondingly costly insertion or feeding means for the labels.

BRIEF DESCRIPTION OF THE DRAWINGS

The process of the present invention will now be described in further detail with reference to the schematic illustration of a suitable apparatus, wherein:

FIG. 1 is a schematic side elevation view of an apparatus for carrying into effect the process of the present invention;

FIG. 2 is a plan view of a deep-drawing foil web with label webs provided thereon in a "floating" manner;

FIG. 3 is a sectional side elevational view of a cup with labels disposed at both sides thereof;

FIG. 4 is a plan view of a deep-drawing foil web with label webs provided thereon in "floating" manner, of a different printing format; and FIG. 5 is a sectional side elevational view of a deeper cup with a one-sided label attachment.

DESCRIPTION OF THE PREFERRED EMBODIMENT

According to FIG. 1 a deep-drawing foil 1 moves from a stock roll 1' via a guide means 17 and a guide roll 18 and through gap 10 of a heating and feeding means 9 composed of two oppositely moving, heat conductive conveyer belts 12 and 13 between which heating elements 14 are respectively disposed. The transport is effected in the working cycle of the deep-drawing means 5 in which cups 3 are molded in a known manner. Downstream of the deep-drawing means 5 the cups 3, by means of a suitable separation system (not shown), are separated from one another after being filled and covered. From the bottom, in parallel to the cup deep-drawing foil 1 a label tape 4 is introduced into the heating and feeding means 9, with the printing formats 2 and 2' being downwardly directed. Prior to entering the heating and feeding means 9 the label tape 4 is guided through a preset break cutting means 11 where it is provided with preset breaking lines 6 and 6', respectively, (FIGS. 2 and 4) which are so formed that they very easily break when loaded. Since, as a rule, a plurality of cup rows are molded in side-by-side relationship in the deep-drawing means 5, the deep-drawing foil 1 has an appropriate width and the label foil web 15, moving from a stock roll 15', is maintained at a corresponding width. However, by means of a longitudinal cutting means 16, the foil web 15 is divided into a plurality of label tapes 4 and 4', respectively, (FIGS. 2 and 4) in accordance with the number of the cup deep-drawing molds 5 disposed in side-by-side relationship.

Prior to the entrance of the deep-drawing foil 1 and of the label tapes 4 and 4', respectively, they are positioned as shown from the bottom in the FIGS. 2 and 4.

The incoming composite tape according to FIG. 2 is preheated in the heating and feeding means 9 so that the label tapes 4 and 4', respectively, adhere in a "floating" manner to the deep-drawing foil 1. The preset breaking lines 6 in strips 4 are respectively located precisely between two adjacent printing formats (oppositely hatched lines), and the whole web is inserted into the deep-drawing means 5 so that the preset breaking lines 6 are respectively disposed precisely in the center below the deep-drawing punches 7. When the punches 7 are depressed, the preset breaking lines 6 break. As the areas 2'' neighboring the printing formats 2 are clamped when the deep-drawing means 5 is closed while the cup deep-drawing foil is further expanded downwardly and laterally until it abuts the walls of the deep-drawing molds 5, the resultant "printing format flags" slide on the deep-drawing foil 1 like a transfer-picture until they abut, with the foil 1, the relatively cold walls of the deep-drawing molds 5 and are firmly connected to the deep-drawing foil 1. In side elevation or in a sectional view according to FIG. 3 cups 3 are provided at opposite faces with labels or printing formats 2.

In the tape according to FIG. 4 the printing formats 2' are disposed respectively on only one side of each preset breaking lines 6'. This tape is introduced into the molds 5 that the present breaking lines 6' are situated immediately ahead of the edge 8 of the deep-drawing molds 5 that are remote from the feeder side. When lowering the deep-drawing punches 7 the preset breaking lines 6' correspondingly break and the printing format flags, now approximately twice as large, abut the other side of the deep-drawing molds 5 which then must, of course, be deeper.

In this mode of operation deeper cups 3 are formed as shown in FIG. 5 having only a one-sided applied label or printing format 2'.

All the cyclically operating elements of the apparatus are suitably coupled and controlled. A more description in this respect will not be required as suitable driving and control elements are readily available for this purpose. Binding means for the connection and the initially "floating" contact when applying heat between the label tape and the cup deep-drawing foil are equally available.

What is claimed is:

1. A process for applying a label to the side wall of a deep-drawn cup of approximately square configuration, said process comprising the steps of:
    (a) feeding a first length of foil tape that is to form the body of the cup to a deep-drawing apparatus;
    (b) feeding a second length of label tape;
    (c) forming a plurality of preset breaking lines in the label tape in a direction that is transverse the feed direction of the label tape;
    (d) superimposing the foil tape over the label tape during the feeding thereof;
    (e) applying heat to the superimposed tapes whereby the label tape is "floatingly" connected to the foil tape;
    (f) introducing the superimposed tapes into the deep-drawing apparatus; and
    (g) advancing the punch of the deep-drawing apparatus against the foil tape to thereby rupture the preset breaking line whereby a single label is secured to the side wall of a cup during the molding thereof.

2. The process according to claim 1 wherein the superimposed tapes are introduced into the deep-drawing apparatus such that the preset breaking lines coincide with the longitudinal axis of the deep-drawing apparatus prior to said advancing step whereby a label is applied to two sides of the container.

3. The process according to claim 1 wherein the superimposed tapes are introduced into the deep-drawing apparatus such that the preset breaking lines are positioned approximately at the far edge of the deep-drawing apparatus in the direction of feed prior to said advancing step whereby a label is applied to only one side of the container.

4. The process according to claim 1 further including the step of longitudinally slitting the label tape prior to said superimposing step to thereby form a plurality of side-by-side label tapes whereby a plurality of cups may be simultaneously deep drawn.